B. BORDEN.
ARTICLE CARRIER.
APPLICATION FILED MAR. 27, 1919.
1,367,654.
Patented Feb. 8, 1921.
2 SHEETS—SHEET 2.
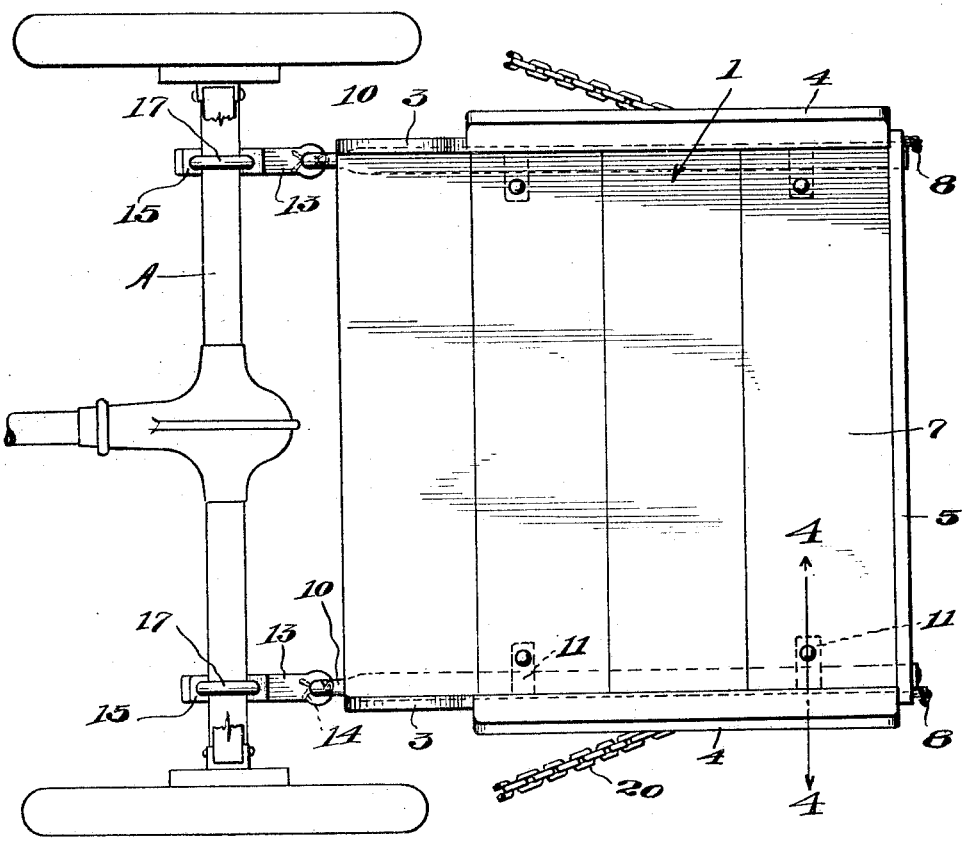
Burton Borden
Inventor

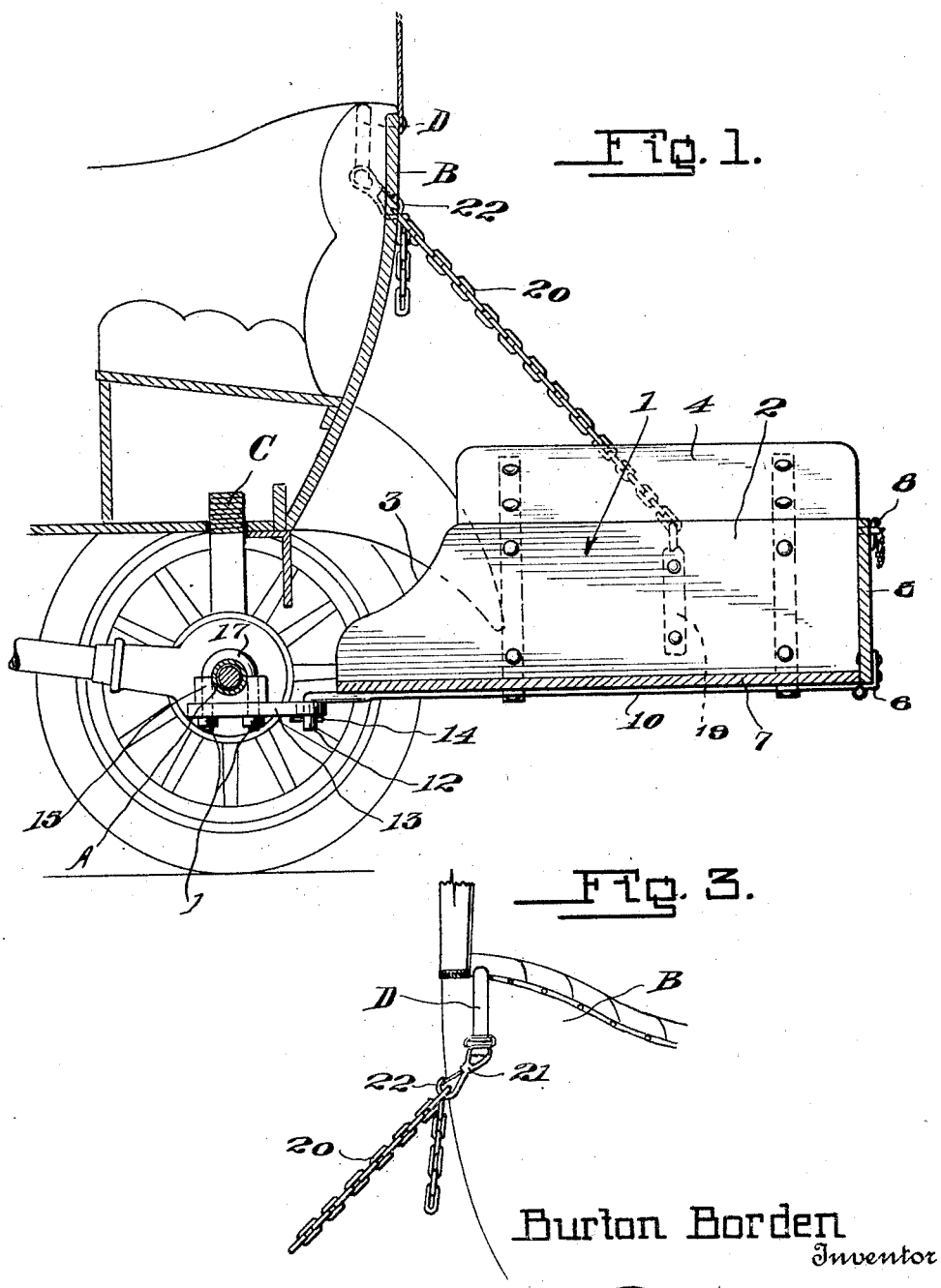

UNITED STATES PATENT OFFICE.

BURTON BORDEN, OF COLUMBIA, SOUTH DAKOTA.

ARTICLE-CARRIER.

1,367,654. Specification of Letters Patent. Patented Feb. 8, 1921.

Application filed March 27, 1919. Serial No. 285,557.

*To all whom it may concern:*

Be it known that I, BURTON BORDEN, a citizen of the United States, residing at Columbia, in the county of Brown and State of South Dakota, have invented certain new and useful Improvements in Article-Carriers, of which the following is a specification.

This invention relates to an article or luggage carrier adapted for attachment to automobiles, and an object of the invention is to provide a carrier, by means of which considerable luggage may be carried by an ordinary automobile, said luggage carrier comprising means for attaching it to the rear axle of the automobile, in such manner as to permit the functioning of the spring of the automobile, or other vehicle, without interference by said luggage carrier.

A further object of the invention, is to provide means for bracing the luggage carrier which includes chains or analogous flexible elements that are connected to the usual hook for maintaining the top of the automobile in a folded position.

Other objects of the invention will appear from the following detailed description taken in connection with the accompanying drawings, forming a part of this specification and in which drawings:

Figure 1 is a longitudinal section through the luggage carrier showing it applied to a fragment of an automobile.

Fig. 2 is a top plan of the luggage carrier showing it applied to a fragment of an automobile.

Fig. 3 is a detail side elevation, illustrating the manner of connecting the flexible bracing members of the carrier to the automobile body, and Fig. 4 is a fragmentary section through the luggage carrier taken on the line 4—4 of Fig. 2.

Referring more particularly to the drawings, A indicates the rear axle casing of the automobile or vehicle, while the body thereof is indicated by the letter B.

The luggage carrier includes a box like structure 1, having upstanding side boards 2, the forward ends of which are cut concavely as indicated at 3 to permit the functioning of the springs C of the vehicle or automobile, without interference therewith by the said carrier. The side boards 2 have flare boards 4, attached to their upper edges, which boards flare outwardly, forming guards to prevent mud from being thrown into the carrier or upon the luggage or articles carried thereby.

An end gate 5 is hingedly connected by means of hinges 6 to the bottom 7 of the carrier 1, and it is held locked in its upward closing position by any suitable type of locking means as indicated at 8. Longitudinally extending brace bars 10 extend along the under surface of the bottom 7 near its edges, the said braces being connected to the bottom 7 by suitable bracing straps 11, which also extend upwardly along the upstanding sides 2 and flare boards 4 as clearly shown in Figs. 1 and 4 of the drawings.

The forward ends of the bars 10 are rounded, and angled, providing downwardly extending round shanks 12. The shanks 12 extend through openings in the rear end of bars 13 and are held against vertical movement therein by suitable keys or cotter pins 14. Each of the bars 13 has a pillow block 15 mounted thereon the upper surface of which is provided with a concave recess to snugly fit about the lower portion of the axle casing A. The shanks or legs of substantially inverted U-shaped bolts 17 extend downwardly through the pillow blocks 15 and bars 13, the bight portions of said bolts engaging over the upper portion of the axle casing A. The pillow blocks 15 and bight portions of the inverted U-shaped bolts 17 are drawn and maintained in secure binding engagement with the axle casing A by nuts 18 upon the threaded ends of the shank of the bolt, which nuts engage against the under surfaces of the bars 13.

Straps are attached to the upstanding sides 2 of the carrier 1 and they have eyes 19 formed upon their upper ends to which chains or analogous flexible means 20 are attached. The chains 20 are adapted for connection, with the members D carried by the vehicle body B and normally employed for maintaining the top of the vehicle in a folded position, by means of snap hooks or analogous fastening devices 21. The snap hooks or analogous fastening devices 21 are attached to the lower ends of the members D and the bills 22 thereof are adapted for engagement through anyone of the links of the chains 20 for bracing the carrier 1 and maintaining it at the proper elevation against sagging under the weight of the articles therein.

When it is desired to detach the carrier structure from the automobile or analogous vehicle, it is only necessary to draw the cotter pin 14 and disconnect the chains 20 from the snap hooks 21, then by upward movement of the carrier structure the shanks 12 may be moved out of the opening in the rear ends of the bars 13 and the carrier structure thus removed or disconnected from the vehicle body.

Changes in details may be made without departing from the spirit of this invention, but;

I claim:

1. An article carrier for attachment to vehicles having a rear axle and top supporting hooks at opposite sides of the body of the vehicle, provided with a body portion, forwardly extending brace bars extending along the bottom of the body portion for reinforcing the same and projecting forwardly therefrom and provided thereat with downturned hooks, clamps adapted for attachment to said axle of the vehicle and provided with rearwardly extending apertured portions through which said downturned hooks are adapted to engage, means for detachably securing the hooks to said clamps, and flexible braces extending from opposite sides of the carrier body at points thereon rearwardly of said downturned hooks and adapted for detachable engagement with said top supporting hooks of the vehicle body, whereby said article carrier is supported at its forward end upon said axle and is supported intermediately upon said body and whereby said carrier body is adapted to swing with the yielding of the body during travel.

2. An article carrier for attachment to vehicles having the usual rear axle and top hooks at opposite sides of the vehicle body, a carrier body, means for detachably mounting the carrier body at its forward end to the axle, and yieldable connecting means between the intermediate portion of the carrier body and said top supporting hooks of the vehicle body whereby said carrier body may be mainly supported upon the axle and may swing with the vibrations of the vehicle.

3. In an article carrier, the combination, with a motor vehicle including a rear axle and body, of a carrier, clamps mounted upon the motor vehicle axle having apertures therein, attaching bars mounted upon said carrier and each having a projection thereon detachably disposed within an aperture of one of the clamps and flexible means connecting said carrier and the motor vehicle body permitting flexibility of the motor vehicle.

BURTON BORDEN.